(12) United States Patent
Schuh et al.

(10) Patent No.: US 9,642,384 B2
(45) Date of Patent: May 9, 2017

(54) FLAVOR SYSTEM AND METHOD FOR MAKING BEVERAGES

(71) Applicant: Altria Client Services Inc., Richmond, VA (US)

(72) Inventors: Christian Schuh, Chesterfield, VA (US); Jason Flora, Richmond, VA (US); Gerd Kobal, Sandy Hook, VA (US); Georgios D. Karles, Richmond, VA (US)

(73) Assignee: ALTRIA CLIENT SERVICES LLC, Richmond, VA (US)

(*) Notice: Subject to any disclaimer, the term of this patent is extended or adjusted under 35 U.S.C. 154(b) by 386 days.

(21) Appl. No.: 14/208,551

(22) Filed: Mar. 13, 2014

(65) Prior Publication Data

US 2015/0257428 A1  Sep. 17, 2015

(51) Int. Cl.
*C12G 3/06* (2006.01)
*A23L 2/56* (2006.01)
*C12G 3/07* (2006.01)

(52) U.S. Cl.
CPC .......... *A23L 2/56* (2013.01); *C12G 3/06* (2013.01); *A23V 2002/00* (2013.01); *C12G 3/065* (2013.01)

(58) Field of Classification Search
CPC ......... A23L 2/56; A23V 2002/00; C12G 3/06; C12G 3/065
USPC ......... 426/62, 534, 535, 536, 537, 538, 590, 426/592
See application file for complete search history.

(56) References Cited

U.S. PATENT DOCUMENTS

| | | |
|---|---|---|
| 3,332,779 A | 7/1967 | Krabbe et al. |
| 3,798,331 A | 3/1974 | Bavisotto et al. |
| 3,822,729 A | 7/1974 | Rochette |
| 3,843,809 A | 10/1974 | Luck |
| 3,908,021 A | 9/1975 | Rehberger et al. |
| 4,021,580 A | 5/1977 | Raymond et al. |
| 4,180,589 A | 12/1979 | Chicoye et al. |
| 4,440,795 A | 4/1984 | Goldstein et al. |
| 4,495,204 A | 1/1985 | Weaver et al. |
| 4,590,085 A | 5/1986 | Sidoti et al. |
| 4,810,505 A | 3/1989 | Pachernegg |
| 4,885,184 A | 12/1989 | Patino et al. |
| 5,082,143 A | 1/1992 | Schramm, Jr. |
| 5,341,957 A | 8/1994 | Sizemore |
| 5,618,572 A | 4/1997 | Tripp et al. |
| 5,731,981 A | 3/1998 | Simard |
| 6,607,013 B1 | 8/2003 | Leoni |
| 6,682,766 B2 | 1/2004 | Blumenstein-Stahl et al. |
| 7,008,652 B2 | 3/2006 | Effler |
| 7,891,286 B2 | 2/2011 | Scarchilli et al. |
| 7,989,014 B2 | 8/2011 | Van Der Ark et al. |
| 8,162,176 B2 | 4/2012 | Rudick |
| D670,539 S | 11/2012 | Starr et al. |
| 8,561,524 B2 | 10/2013 | DeMiglio et al. |
| 8,586,117 B2 | 11/2013 | Vastardis et al. |
| 8,590,753 B2 | 11/2013 | Marina et al. |
| 8,673,384 B2 | 3/2014 | Kageyama et al. |
| 2002/0102345 A1 | 8/2002 | Ramirez |
| 2006/0118581 A1 | 6/2006 | Clark |
| 2006/0193947 A1 | 8/2006 | Anderson et al. |
| 2007/0205221 A1 | 9/2007 | Carpenter et al. |
| 2007/0231428 A1 | 10/2007 | Mensour et al. |
| 2007/0254063 A1 | 11/2007 | Aerts et al. |
| 2008/0193599 A1 | 8/2008 | Binder et al. |
| 2009/0028999 A1 | 1/2009 | Melisch et al. |
| 2009/0204473 A1 | 8/2009 | Sommerfeld |
| 2009/0317511 A1 | 12/2009 | Kawamata et al. |
| 2010/0047386 A1 | 2/2010 | Tatera |
| 2010/0221404 A1 | 9/2010 | Little |
| 2010/0308078 A1 | 12/2010 | Saveliev et al. |
| 2011/0011269 A1 | 1/2011 | Choi |
| 2011/0017776 A1 | 1/2011 | Metropulos et al. |
| 2011/0318459 A1 | 12/2011 | George et al. |
| 2012/0035761 A1 | 2/2012 | Tilton et al. |
| 2012/0114819 A1 | 5/2012 | Ragnarsson et al. |
| 2013/0064956 A1 | 3/2013 | Zeller et al. |
| 2013/0101724 A1 | 4/2013 | Kawamoto et al. |
| 2013/0233180 A1 | 9/2013 | Belmont |
| 2013/0239817 A1 | 9/2013 | Starr et al. |
| 2014/0272006 A1 | 9/2014 | Schuh et al. |

FOREIGN PATENT DOCUMENTS

| | | |
|---|---|---|
| CN | 101195793 A | 6/2008 |
| CN | 101195794 A | 6/2008 |
| DE | 19619370 A1 | 11/1997 |
| DE | 198 13 749 A1 | 10/1999 |
| DE | 202004020429 U1 | 7/2005 |
| DE | 102004057546 A1 | 2/2006 |
| GB | 2 145 427 A | 3/1985 |
| GB | 2454558 A | 5/2009 |
| NZ | 546370 A | 8/2010 |
| WO | 99/27070 A1 | 6/1999 |
| WO | WO 99/27070 A1 | 6/1999 |
| WO | WO 02/02497 A1 | 1/2002 |
| WO | 2014/152558 A2 | 9/2014 |

OTHER PUBLICATIONS

Nykanen et al, Volatile Fatty Acids in Some Brands of Whisky, Cognac, and Rum, J. Fd. Sci. vol. 33, 1968, pp. 88-92.*
Invitation to Pay Additional Fees and Partial International Search Report for PCT/US2014/027473 dated Oct. 9, 2014.
Irwin et al., "A Rapid Method for the Extraction and Anaylsis of Beer Flavour Components," XP-002728436, Mar.-Apr. 1987, Journal of the Institute of Brewing, vol. 93, pp. 113-115.

(Continued)

*Primary Examiner* — Leslie Wong
(74) *Attorney, Agent, or Firm* — Buchanan Ingersoll & Rooney PC

(57) ABSTRACT

A method of making a flavored beverage includes combining water and a plurality of flavor compounds in an amount sufficient to impart the flavor of a wine, a whiskey or a beer. A kit for making a flavored beverage can include a plurality of flavor compounds, a quantity of yeast, a quantity of sugar and a container.

4 Claims, 3 Drawing Sheets

(56) References Cited

OTHER PUBLICATIONS

Database FSTA, International Food Information Service, XP-002728437, Hanke et al., "Influence of ethyl acetate, isoamyl acetate and linalool on off-flavour perception in beer," 2011, 1 page, FS-2011-07-Hc3181.
International Search Report and Written Opinion mailed Jan. 30, 2015 for PCT/US2014/027473.
Ferreira, Vincente et al., "Chemical Characterization of the Aroma of Grenache Rosé Wines: Aroma Extract Dilution Analysis, Quantitative Determination, and Sensory Reconstitution Studies", J. Agric. Food Chem., 2002, 50, pp. 4048-4054.
Ferreira, Vincente et al., "Fast and Quantitative Determination of Wine Flavor Compounds Using Microextraction with Freon 113", J. Agric. Food Chem., Sep. 1993, 41, No. 9, pp. 1413-1420.
Lopez, Ricardo et al., "Determination of minor and trace volatile compounds in wine by solid-phase extraction and gas chromatography with mass spectrometric detection", Journal of Chromatography A, 966, 2002, pp. 167-177.
Lee, Monica K. Y. et al., "Measurement of Thresholds for Reference Compounds for Sensory Profiling of Scotch Whisky", Journal of the Institute of Brewing, vol. 106, No. 5, 2000, pp. 287-294.
Lee, Monica K. Y. et al., "Origins of Flavour in Whiskies and a Revised Flavour Wheel: a Review", Journal of the Institute of Brewing, vol. 107, No. 5, 2001, pp. 287-313.
Poisson, Luigi et al., "Characterization of the Key Aroma Compounds in an American Bourbon Whisky by Quantitative Measurements, Aroma Recombination, and Omission Studies", J. Agric. Food Chem., 2008, 56, pp. 5820-5826.
Williams, A.A., "Recent Developments in the Field of Wine Flavour Research", Journal of the Institute of Brewing, Jan.-Feb. 1982, vol. 88, pp. 43-53.
International Search Report issued on Jun. 9, 2015, by the European Patent Office, in corresponding International Application No. PCT/2015/020455.
Luigi, Poisson et al.; "Characterization of the Key Aroma Compounds in an American Bourbon Whisky by Quantitative Measurements, Aroma Recombination, and Omission Studies", Journal of Agricultural and Food Chemistry, vol. 56, No. 14, Jun. 27, 2008, pp. 5820-5826.
The Siebel Institute of Technology; Specialty Sensory Training Kit; http://www.siebelinstitute.com/products-a-books/sensory-training-kits?page=shop.product_details&flypage=flypage.tpl&product_id=35&category_id=6.
Adventures in HomeBrewing; Flavored Extract Cans; http://www.homebrewing.org/flavored-Extract-Cans_c_220.html.
Mr. Beer Home Brewing; Mr. Beer Kits; http://www.mrbeer.com/beer-kits.
Monster Brew; Beer and wine kits; http://www.monsterbrew.com/cat-IngredientKits.cfm.
Arne Glabasnia et al., "Sensory-Directed Identification of Taste-Active Ellagitannins in American (*Quercus alba* L.) and European Oak Wood (*Quercus robur* L.) and Quantitative Analysis in Bourbon Whiskey and Oak-Matured Red Wines", Journal of Agricultural and Food Chemistry, Apr. 7, 2006, pp. 3380-3390, American Chemical Society.
Helge T. Fritsch et al., "Identification Based on Quantitative Measurements and Aroma Recombination of the Character Impact Odorants in a Bavarian Pilsner-type Beer", Journal of Agricultural and Food Chemistry, Aug. 25, 2005, pp. 7544-7551, American Chemical Society.
Luici Poisson et al., "Characterization of the Most Odor-Active Compounds in an American Bourbon Whisky by Application of the Aroma Extract Dilution Analysis", Journal of Agricultural and Food Chemistry, Jun. 21, 2008, pp. 5813-5819, American Chemical Society.
Luici Poisson et al., "Characterization of the Key Aroma Compounds in an American Bourbon Whisky by Quantitative Measurements, Aroma Recombination, and Omission Studies", Journal of Agricultural and Food Chemistry, Jun. 27, 2008, pp. 5813-5819, American Chemical Society.
Gesa Haseleu et al., "Structure determination and sensory evaluation of novel bitter compounds formed from β-acids of hop (*Humulus lupulus* L.) upon wort boiling" Food Chemistry, (2009), pp. 71-81, Elsevier Ltd.

\* cited by examiner

FLAVOR SYSTEM AND METHOD FOR MAKING BEVERAGES

BACKGROUND

Beverages, including alcoholic beverages are produced through the world, but shipping beverages can be cost prohibitive due to the weight thereof. Typically, beverages include about 90 to 95% water, which is a significant portion of the weight. Thus, the ability to create beverages as needed by the addition of water to a concentrated mixture of flavors saves significantly on costs of storage and shipping.

Moreover, stocking a bar with a large variety of fermented drinks such as beers, wines, champagnes, and liquors can be cost and space prohibitive. In addition, the time and ingredients necessary to ferment and form various crafted beverages such as beers, wines and liquors can be lengthy and expensive.

Thus, a flavor system, method and apparatus for making a variety of beverages that taste like various crafted beers, wines, champagnes, and liquors, in particular whiskeys and scotches, is desirable.

SUMMARY

A method of making a beverage having the flavor of beer, the method comprising: adding at least one flavor compound selected from a first group of compounds, the first group of compounds consisting of 3-methylbutanol, 2-methylbutanol, 2,3-butanedione, vanilline, 2-methylpropanol, 3-methylbutanal, 2,3-pentanedione, 2-methylpropanal, 2-methylbutanal, furaneol, 2-aminoacetophenone, and ethylfuraneol to a quantity of water, wherein the at least one flavor compound selected from the first group is added in an amount ranging from about 0.1 µg/l to about 5,000,000 µg/l; adding at least one flavor compound from a second group of compounds to the quantity of water, the second group consisting of 2-phenylethanol, 2-phenylacetic acid, 2-phenylethyl acetate, phenylacetaldehyde, myrcene, geraniol, and linalool, wherein the at least one flavor compounds selected from the second group is added in an amount ranging from about 1 µg/l to about 75,000 µg/l; and adding at least one flavor compound from a third group of aroma compounds to the quantity of water, the third group consisting of hops extract, tetra-iso-extract 10%, rho-iso-extract 10%, isomerized hop extract 30%, cis-isohumolone, trans-isohumolone, cis-isocohumulone, trans-isocohumulone, isoadhumulone, and comultifidolglycoside, wherein the at least one flavor compounds selected from the third group is added in an amount ranging from about 1 µg/l to about 30,000,000 µg/l. The flavor compounds are included in an amount sufficient to form a beverage having the flavor of beer without the need for brewing, fermentation, or distillation.

A method of making a beverage having the flavor of wine, the method comprising: adding at least one flavor compound from a first group of flavor compounds to a quantity of water, the first group consisting of acetaldehyde, ethyl butyrate, ethyl-2-methylpropanoate, ethyl octanoate, ethyl hexanoate, ethyl-3-methylbutyrate, ethyl-2-methylbutyrate, (E)-b-damascenone, 3-methylbutyl acetate, 1,1-diethoxyethane, trans-ethyl cinnamate, ethyl decanoate, and ethyl propanoate, wherein the at least one flavor compound from the first group is added in an amount ranging from about 0.1 µg/l to about 50,000 µg/l; adding at least one flavor compound from a second group of flavor compounds to the quantity of water, the second group consisting of whiskey lactone, 2-methoxyphenol, 4-allyl-2-methoxyphenol, 5-pentyldihydrofuran-2(3H)-one, 4-ethyl-2-methoxyphenol, 4-methyl-2-methoxyphenol, 4-propyl-2-methoxyphenol, 5-hexyldihydrofuran-2(3H)-one, 2-methoxy-5-methylphenol, and 2,6-dimethoxyphenol, wherein the at least one flavor compound from the second group is added in an amount ranging from about 0.1 µg/l to about 2,000 µg/l; adding at least one flavor compound from a third group of flavor compounds to the quantity of water, the third group of flavor compounds consisting of tartaric acid, succinic acid, lactic acid, citric acid, galacturonic acid, pyruvic acid, malic acid, and acetic acid, wherein the at least one flavor compound from the third group is added in an amount ranging from about 1,000 ng/l to about 10,000,000 m/l; and adding at least one flavor compound from a fourth group of flavor compounds to the quantity of water, the fourth group of flavor compounds consisting of tannic acid, oak extract, trans aconitic acid, cis-aconitic acid, ellagic acid, caftaric acid, caffeic acid, castalagin, coutaric acid, fertaric acid, gallic acid, quercetin-3-O-galactoside, syringetin-3-O-glucoside, quercetin-3-O-glucuronide, kaempferol-3-O-glucoside, isorhamnetinglucoside, and grape seed extract, wherein the at least one flavor compound from the fourth group is added in an amount ranging from about 50 µg/l to about 10,000,000 µg/l. The flavor compounds are included in an amount sufficient to form a beverage having the flavor of wine without the need for fermentation.

A method of making a beverage having the flavor of whiskey, the method comprising: adding at least one flavor compound selected from a first group of compounds, the first group of compounds consisting of 3-methylbutanol, 2-methylbutanol, 2,3-butanedione, vanilline, 2-methylpropanol, 3-methylbutanal, 2,3-pentanedione, 2-methylpropanal, 2-methylbutanal, furaneol, and ethylfuraneol to a quantity of water, wherein the at least one flavor compound selected from the first group is added in an amount ranging from about 0.5 µg/l to about 10,000,000 ng/l; adding at least one flavor compound from a second group of flavor compounds to a quantity of water, the second group consisting of acetaldehyde, ethyl butyrate, ethyl-2-methylpropanoate, ethyl octanoate, ethyl hexanoate, ethyl-3-methylbutyrate, ethyl-2-methylbutyrate, (E)-b-damascenone, 3-methylbutyl acetate, 1,1-diethoxyethane, trans-ethyl cinnamate, ethyl-3-phenylpropanoate, ethyl decanoate, and ethyl propanoate, wherein the at least one flavor compound from the second group is added in an amount ranging from about 1 µg/l to about 300,000 µg/l; adding at least one flavor compound from a third group of flavor compounds to the quantity of water, the third group consisting of whiskey lactone, 2-methoxyphenol, 4-allyl-2-methoxyphenol, 5-pentyldihydrofuran-2(3H)-one, 4-ethyl-2-methoxyphenol, 4-methyl-2-methoxyphenol, 4-propyl-2-methoxyphenol, 5-hexyldihydrofuran-2(3H)-one, 2-methoxy-5-methylphenol, and 2,6-dimethoxyphenol, wherein the at least one flavor compound from the third group is added in an amount ranging from about 1 µg/l to about 50,000 µg/l; adding at least one flavor compound from a fourth group of flavor compounds to the quantity of water, the fourth group of flavor compounds consisting of tannic acid, oak extract, trans aconitic acid, cis-aconitic acid, ellagic acid, and lyoniresinol, wherein the at least one flavor compound from the fourth group is added in an amount ranging from about 100 µg/l to about 5,000,000 µg/l; and adding at least one flavor compound from a fifth group of flavor compounds to the quantity of water, the fifth group of flavor compounds consisting of 4-ethylphenol, 4-methylphenol, 3-methylphenol, 2-methylphenol, 3-ethylphenol, 2-ethylphenol, and phenol, wherein the at least one flavor compound from the fifth group is added in an amount ranging from about 1 µg/l to about 20,000 µg/l. The flavor compounds are included in an amount sufficient to form a beverage having the flavor of whiskey without the need for distillation, fermentation and/or aging.

A kit for making a carbonated flavored beverage includes (a) at least one flavor compound from a first flavor group; (b) at least one flavor compound from a second flavor group; (c) at least one flavor compound from a third flavor group; (d) at least one flavor compound from a fourth flavor group; (e) at least one aroma compound from a first aroma compound group; (f) at least one aroma compound from a second aroma compound group; (g) at least one aroma compound from a third aroma compound group; (h) at least one aroma compound from a fourth aroma compound group; (i) at least one aroma compound from a fifth aroma compound group; (j) at least one aroma compound from a sixth aroma compound group; (k) a quantity of yeast; (l) a quantity of sugar; and (m) a container sized to contain the flavor system, yeast, sugar and a quantity of water. Each of the flavor compound groups imparts a different flavor or aroma of a beer or a wine such that the flavor compounds can be mixed in different quantities and combinations to form a beverage having the flavors and aromas of a desired beer or wine in less than about 10 days.

DETAILED DESCRIPTION

Flavor perception of a consumable product is defined as the combined impression of specific aroma, taste and trigeminal compounds along with entities that evoke mouth feel impressions such as astringency, mouth coating, fullness, etc. Aroma compounds are volatiles that interact with olfactory receptors in the nose evoking a signal to the brain interpreted as smell, while the five basic tastes are elicited by interactions of tastants with specific taste receptors for salt, sweet, bitter, sour and umami tastes, respectively.

In general, out of the many hundreds of chemical entities that are found in natural products, especially those of agricultural origin that may also have been subjected to additional fermentation or prolonged storage, only an order of ten may be responsible for aroma, taste and mouthfeel. State of the art separation, isolation and chemical analysis techniques have allowed the identification and quantification of flavor-relevant compounds out of the many hundreds that may be detected in a natural product. This sophisticated approach, called "sensomics," has been used extensively for the compositions and methods described in this application.

A flavor that mimics exactly the sensory attributes of a certain product by using the same flavor compounds of the natural product is called "nature craft identical" and the combination of chemical entities that mimic the natural product is called "recombinant." Recombinants may be altered or new compounds added to compensate for flavor compounds that cannot be used due to toxicity (not generally recognized as safe (GRAS)) or availability issues and to create new superior flavors. Through omissions or additions of certain compounds in the "recombinants" described in this application, important interplays between aroma, flavor and mouthfeel impressions are used to create nature craft identical compositions. This approach is primarily based on chemical identification, receptor molecular biology and psychophysics and differs from traditional trial and error artisan creations.

Figure 1:
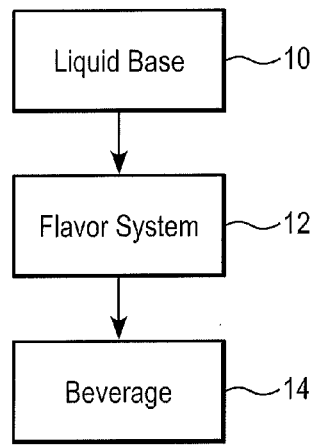
FIG. 1 is a flow chart showing the method of making a beverage using a flavor system as described herein.

A flavor system 12 for making a beverage 14 is provided herein. As used herein, the term "flavor system" describes one or more flavor compounds from each of thirteen different flavor compound groups having certain flavor characteristics that are in combination within certain ranges to create beverages having the flavor of beer, wine, sparkling wine, cider and/or whiskey. The flavor compounds include those compounds actually found in various wines, beers and/or whiskeys, which have been chemically analyzed to determine the compounds contained therein. The flavor system 12 is combined with a liquid base 10 to form a beverage 14 as shown in FIG. 1.

As used herein, the term "flavor" refers to taste, aroma and sensation and is thus a mixture of tastants, aroma compounds and sensates. Thus, for example, the beverages formed herein which have the flavor of beer provide a mixture of tastants, aroma compounds and sensates which mimics that found in a traditionally brewed beer.

As used herein, the term "wine" describes any beverage formed by fermenting grapes and/or other fruits and vegetables.

As used herein, the term "beer" describes a beverage brewed by fermenting malt with sugar and yeast and flavoring with hops.

As used herein, the term "whiskey" describes a beverage made from fermented grain such as rye or barley, which can be aged or blended.

The flavor system 12 can be mixed with a liquid base 10, preferably water, to create a beverage having the flavor and/or mouthfeel of beverages such as wine, sparkling wine, beer, cider, and/or whiskey, but without the need for fermentation, brewing and/or other costly and time consuming measures associated with the production of wines, beers, ciders and whiskeys. In an alternative embodiment, the flavor system can be combined with a low flavor wine, beer, cider and/or whiskey to create a superior wine, beer, cider and/or whiskey flavored beverage.

The flavor system and beverages made therefrom provide several advantages over conventional brewing, fermentation and other beverage making operations. First of all, while not wishing to be bound by theory, it is believed that compounds present in conventionally brewed and/or fermented beverages may be responsible for spoilage, thereby limiting the shelf-life of the conventional beverages. In contrast, the flavor system and resulting beverages as described herein can be tailored to exclude compounds responsible for spoilage. Moreover, other compounds in the conventional beverages could have unwanted properties. Such compounds, which may provide little flavor can be excluded from the flavor systems and beverages provided herein.

In addition, the use of flavor systems to form beverages as described herein allows for quick and easy customization of beverages as compared to conventional beverages and manufacturing systems.

As used herein, the term "low flavor beer" is used to describe a light beer and/or a beer having a light color and little flavor. Suitable low flavor beers include those described in U.S. Pat. No. 7,008,652 to Effler; U.S. Pat. No.

4,495,204 to Weaver et al.; U.S. Pat. No. 4,180,589 to Chicoye et al.; and U.S. Pat. No. 4,440,795 to Goldstein et al.; the entire content of each of which is incorporated herein by reference thereto.

Figure 2:
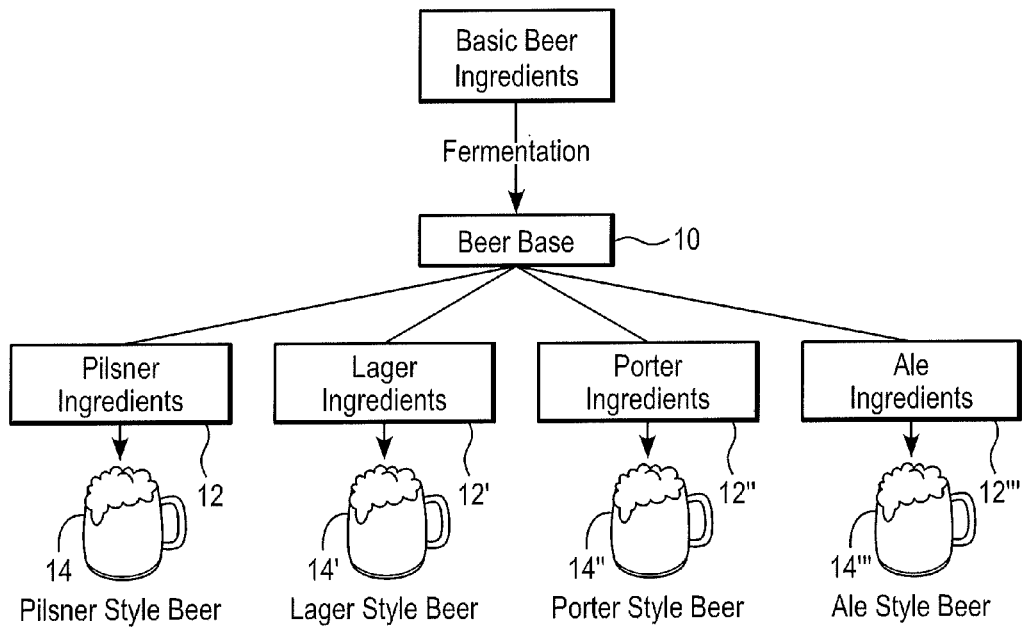
FIG. 2 is a flow chart showing a second embodiment of a method of making a beverage using a flavor system as described herein.

As shown in FIG. 2, a liquid base 10 can be made by fermenting a low flavor beer. Alternatively, the liquid base 10 can be water. A variety of different flavor systems 12, 12', 12", 12''' can be formulated to include varying amounts of a plurality of flavor and/or aroma compounds found in various styles of beers. The flavor system 12', 12", 12''' can be added to the liquid base 10 to form various beer style beverages having the flavor of pilsner style beer, lager style beer, porter style beer, ale style beer and the like.

As shown in FIG. 2, the flavor system 12 can be altered by substituting or adding additional flavor and/or aroma compounds to the flavor system 12, as described herein. The flavor system 12 can include at least one flavor or aroma compound from each of thirteen different flavor compound groups described below. Each flavor group includes compounds which impart a particular aroma, taste or mouth feel. Thus, an adult consumer can purchase a flavor system and create a beverage having only the flavor notes that the consumer prefers and/or only the flavor notes associated with the preferred type of wine, beer, cider and/or whiskey. The consumer can then add additional quantities of the same flavor and/or aroma compounds or add additional flavor and/or aroma compounds to the flavor system to alter the flavor and/or aroma of the beverage, which mimics the taste and/or mouth feel of conventionally brewed and/or fermented beers, wines, ciders and liquors, including whiskey and scotch.

Various flavor systems 12 having a wide variety of flavors can be rapidly and inexpensively produced and then combined with a liquid base to form a beverage which mimics the taste and aroma of conventionally brewed and/or fermented beer, wine, liquor or mixed beverages, or enhances the taste of low flavor beers.

In the preferred embodiment, the flavor system 12 includes at least one flavor compound from one or more of each of the following groups: (1) Cheesy, Sweaty Flavor Group; (2) Malty, Buttery and/or Sweet Flavor Group; (3) Floral and/or Honey Flavor Group; (4) Fruity Flavor Group; (5) Smoky, Coconut, Woody Flavor Group; (6) Cooked, Seasoning, Fatty Flavor Group; (7) Phenolic/Medicinal Flavor Group; (8) Sour Taste Group; (9) Sweet Taste Group; (10) Salty and Bitter Taste Group; (11) Astringent, Mouth Feel Group; (12) Bitter Taste Group; and/or (13) Umami and Mouthfeel Taste Group.

However, if the flavor system is to be used to form a beverage which would not include flavor compounds from a particular group as shown in the tables below, none of those compounds would be included in the flavor system. The flavor groups can include volatile compounds which can impart certain aromas, tastes and sensations to the flavor system 12 and resulting beverage depending on the combination and concentration of the various aroma compounds included therein. The flavor compounds in each group are generally interchangeable with other compounds in the same group.

Moreover, certain compounds, particularly those in the Astringent, Mouth Feel Group may elicit mouth feel impressions such as tingling, mouth-puckering, smooth, velvety, mouth-coating, etc. In addition, certain compounds may affect the presentation of aromas and modulate the perceived aroma intensity.

Preferably, the flavor system 12 is combined with a liquid base 10 (as shown in FIG. 1) to form a beverage 14. In the preferred embodiment, the liquid base 10 is water or a combination of water and ethanol. However, in other embodiments, the liquid base 10 can be a low flavor beer (as shown in FIG. 2). However, the flavor compounds and concentrations thereof used in the flavor system 12 for addition to a low flavor beer base 10 should be adjusted to account for any already present flavor compounds in the low flavor beer. For example, if a low flavor beer is used as the base 10 and the low flavor beer has fruity flavors therein, the amount of fruity compounds should be reduced and/or limited in the flavor system.

The compounds included in each flavor group along with a range of the amount of each compound that can be included in the flavor system 12 is shown in Tables 1-13 below.

As shown in Table 1, Flavor Group 1 includes seven compounds that can impart a cheesy or sweaty aroma to a beverage formed from the flavor system. The compounds of Flavor Group 1 are selected from the group consisting of octanoic acid, 2-methylpropanoic acid, butanoic acid, 3-methylbutanoic acid, 2-methylbutanoic acid, decanoic acid, hexanoic acid and combinations thereof. The range of each compound of Flavor Group 1 that can be included in any beverage formed from the flavor system 12, the range of each compound for inclusion in a wine-like beverage formed from the flavor system 12, the range of each compound for inclusion in whiskey-like beverage formed from the flavor system 12 and the range of each compound for inclusion in beer-like beverages formed from the flavor system 12 in micrograms per liter (µg/l) is shown. In embodiments, the compounds of Flavor Group 1 may be included, for example, in a wine-like beverage, a whiskey-like beverage, or in a beer-like beverage. In other embodiments, the compounds of Flavor Group 1 may not be desirable for inclusion in whiskey-like beverages—thus, in embodiments, a flavor system for use to create a whiskey beverage would not include aroma compounds from Flavor Group 1. In addition, each of the Flavor Group 1 compounds can be substituted for other compounds in the same group to achieve a similar aroma.

TABLE 1

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 1 (cheesy, sweaty aroma) | octanoic acid | 250 | 50,000 | 250 | 25,000 | 250 | 50000 | 250 | 25,000 |
| | 2-methylpropanoic acid | 200 | 10,000 | 200 | 10,000 | 0 | 0 | 200 | 5,000 |
| | butanoic acid | 200 | 15,000 | 200 | 15,000 | 0 | 0 | 200 | 10,000 |
| | 3-methylbutanoic acid | 100 | 10,000 | 200 | 10,000 | 0 | 0 | 100 | 5,000 |
| | 2-methylbutanoic acid | 50 | 10,000 | 100 | 10,000 | 0 | 0 | 50 | 2,000 |
| | decanoic acid | 50 | 100,000 | 50 | 2,000 | 500 | 100000 | 50 | 10,000 |
| | hexanoic acid | 300 | 15,000 | 300 | 15,000 | 0 | 0 | 300 | 10,000 |

As shown in Table 2, Flavor Group 2 includes twelve compounds that can impart a malty, buttery and/or sweet aroma to a beverage formed from the flavor system 12. The compounds of Flavor Group 2 are selected from the group consisting of 3-methylbutanol, 2-methylbutanol, 2,3-butanedione, vanilline, 2-methylpropanol, 3-methylbutanal, 2,3-pentanedione, 2-methylpropanal, 2-methylbutanal, furaneol, 2-aminoacetophenone, ethylfuraneol and combinations thereof. The range of each compound of Flavor Group 2 that can be included in any flavor system 12, the range of each compound for inclusion in a flavor system 12 for forming a wine-like beverage, the range of each compound for inclusion in a flavor system 12 for forming a whiskey-like beverage and the range of each compound for inclusion in a flavor system 12 for forming a beer-like beverage in micrograms per liter (µg/l) is shown. Moreover, each of the Flavor Group 2 compounds can be substituted for other compounds in the same group to achieve a similar aroma.

TABLE 2

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 2- (malty, buttery, sweet aroma) | 3-methylbutanol | 5,000 | 5,000,000 | 30,000 | 1,500,000 | 100,000 | 5,000,000 | 5,000 | 250,000 |
| | 2-methylbutanol | 5,000 | 5,000,000 | 30,000 | 1,500,000 | 100,000 | 5,000,000 | 5,000 | 250,000 |
| | 2,3-butanedione | 5 | 50,000 | 100 | 50,000 | 5 | 200 | 5 | 50,000 |
| | vanilline | 1 | 10,000 | 50 | 10,000 | 100 | 25,000 | 1 | 50 |
| | 2-methylpropanol | 5,000 | 10,000,000 | 5,000 | 250,000 | 100,000 | 10,000,000 | 5,000 | 5,000,000 |
| | 3-methylbutanal | 3 | 5,000 | 10 | 1,000 | 20 | 5,000 | 3 | 150 |
| | 2,3-pentanedione | 1 | 50,000 | 1 | 50,000 | 1 | 50,000 | 1 | 50,000 |
| | 2-methylpropanal | 1 | 1000 | 5 | 500 | 20 | 1,000 | 1 | 50 |
| | 2-methylbutanal | 0.5 | 8,000 | 20 | 2,000 | 100 | 8,000 | 0.5 | 25 |
| | furaneol | 10 | 1,500 | 10 | 1,000 | 10 | 1,000 | 30 | 1,500 |
| | 2-aminoacetophenone | 0.1 | 50 | 0 | 0 | 0 | 0 | 0.1 | 50 |
| | ethylfuraneol | 0.5 | 100 | 0.5 | 50 | 0.5 | 50 | 2 | 100 |

As shown in Table 3, Flavor Group 3 includes seven compounds that can impart a floral and/or honey aroma to a beverage formed from the flavor system 12. The compounds of Flavor Group 3 are selected from the group consisting of 2-phenylethanol, 2-phenylacetic acid, 2-phenylethyl acetate, phenylacetaldehyde, linalool, myrcene, geraniol, and combinations thereof. The range of each compound of Flavor Group 3 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (µg/l) is shown. Moreover, each of the Flavor Group 3 compounds can be substituted for other compounds in the same group to achieve a similar aroma.

TABLE 3

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 3- (Floral, Honey) | 2-phenylethanol | 1,000 | 200,000 | 1,000 | 200,000 | 5,000 | 200,000 | 1,500 | 75,000 |
| | 2-phenylacetic acid | 10 | 1,500 | 10 | 750 | 10 | 1,000 | 25 | 1,500 |
| | 2-phenylethyl acetate | 5 | 10,000 | 5 | 500 | 100 | 10,000 | 5 | 500 |
| | phenylacetaldehyde | 1 | 500 | 1 | 500 | 1 | 500 | 1 | 500 |
| | linalool | 0.5 | 10,000 | 0.5 | 500 | 0.5 | 500 | 10 | 10,000 |
| | geraniol | 1 | 100 | 1 | 100 | 1 | 100 | 1 | 100 |
| | myrcene | 500 | 50,000 | 0 | 0 | 0 | 0 | 500 | 50,000 |

As shown in Table 4, Flavor Group 4 includes fourteen compounds that can impart a fruity aroma to a beverage formed from the flavor system 12. The compounds of Flavor Group 4 are selected from the group consisting of acetaldehyde, ethyl butyrate, ethyl-2-methylpropanoate, ethyl octanoate, ethyl hexanoate, ethyl-3-methylbutyrate, ethyl-2-methylbutyrate, (E)-b-damascenone, 3-methylbutyl acetate, 1,1-diethoxyethane, trans-ethyl cinnamate, ethyl-3-phenylpropanoate, ethyl decanoate, ethyl propanoate, and combinations thereof. The range of each compound of Flavor Group 4 that can be included in the flavor system for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (μg/l) is shown. Moreover, each of the Flavor Group 4 compounds can be substituted for other compounds in the same group to achieve a similar aroma.

TABLE 4

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low μg/l | high μg/l | low μg/l | high μg/l | low μg/l | high μg/l | low μg/l | high μg/l |
| Flavor Group 4- (fruity aroma) | acetaldehyde | 25 | 300,000 | 1,000 | 50,000 | 3,000 | 300,000 | 25 | 25,000 |
| | ethyl butyrate | 10 | 5,000 | 10 | 750 | 100 | 5,000 | 20 | 1,000 |
| | ethyl-2-methylpropanoate | 0.3 | 2,500 | 5 | 500 | 50 | 2,500 | 0.3 | 15 |
| | ethyl octanoate | 5 | 25,000 | 1 | 2,000 | 500 | 25,000 | 20 | 1,000 |
| | ethyl hexanoate | 5 | 10,000 | 5 | 2,000 | 100 | 10,000 | 20 | 1,000 |
| | ethyl-3-methylbutyrate | 0.04 | 1000 | 1 | 250 | 10 | 1000 | 0.04 | 2 |
| | ethyl-2-methylbutyrate | 0.06 | 500 | 0.5 | 50 | 10 | 500 | 0.06 | 3 |
| | (E)-b-damascenone | 0.1 | 100 | 0.1 | 5 | 1 | 100 | 0.2 | 10 |
| | 3-methylbutyl acetate | 100 | 25,000 | 300 | 10,000 | 500 | 25,000 | 100 | 15,000 |
| | 1,1-diethoxyethane | 5 | 10,000 | 50 | 2,000 | 2,000 | 100,000 | 5 | 250 |
| | trans-ethyl cinnamate | 0.2 | 100 | 0.2 | 10 | 1 | 100 | 0.2 | 10 |
| | ethyl-3-phenylpropanoate | 10 | 1000 | 0 | 0 | 10 | 1000 | 0 | 0 |
| | ethyl decanoate | 1 | 100,000 | 1 | 1000 | 100 | 100,000 | 1 | 1000 |
| | ethyl propanoate | 5 | 5000 | 5 | 500 | 50 | 5000 | 5 | 500 |

As shown in Table 5, Flavor Group 5 includes ten compounds that can impart a smoky, coconut, and/or woody aroma to a beverage formed from the flavor system 12. The compounds of Flavor Group 5 are selected from the group consisting of whiskey lactone, 2-methoxyphenol, 4-allyl-2-methoxyphenol, 5-pentyldihydrofuran-2(3H)-one, 4-ethyl-2-methoxyphenol, 4-methyl-2-methoxyphenol, 4-propyl-2-methoxyphenol, 5-hexyldihydrofuran-2(3H)-one, 2-methoxy-5-methylphenol, 2,6-dimethoxyphenol, and combinations thereof. The range of each compound of Flavor Group 5 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (μg/l) is shown. However, as shown, in embodiments, when creating a flavor system for forming a beverage having the flavor of beer, whiskey lactone, 5-pentyldihydrofuran-2(3H)-one, and 5-hexyldihydrofuran-2 (3H)-one would not be included. Moreover, each of the Flavor Group 5 compounds can be substituted for other compounds in the same group to achieve a similar aroma.

TABLE 5

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low μg/l | high μg/l | low μg/l | high μg/l | low μg/l | high μg/l | low μg/l | high μg/l |
| Flavor Group 5- (Smoky, coconut, woody aroma) | whiskey lactone | 50 | 50,000 | 50 | 2,000 | 100 | 50,000 | 0 | 0 |
| | 2-methoxyphenol | 0.1 | 10,000 | 0.1 | 200 | 10 | 10,000 | 0.1 | 500 |
| | 4-allyl-2-methoxyphenol | 0.1 | 1,000 | 0.1 | 100 | 10 | 1,000 | 0.1 | 500 |
| | 5-pentyldihydrofuran-2(3H)-one | 2 | 500 | 2 | 100 | 10 | 500 | 0 | 0 |
| | 4-ethyl-2-methoxyphenol | 0.5 | 5,000 | 0.5 | 100 | 5 | 5,000 | 0.5 | 1,000 |
| | 4-methyl-2-methoxyphenol | 0.5 | 10,000 | 0.5 | 50 | 10 | 10,000 | 0.5 | 1,000 |

TABLE 5-continued

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| | 4-propyl-2-methoxyphenol | 0.5 | 500 | 0.5 | 50 | 1 | 500 | 0.5 | 1,000 |
| | 5-hexyldihydrofuran-2(3H)-one | 0.3 | 70 | 0.3 | 10 | 1 | 70 | 0 | 0 |
| | 2-methoxy-5-methylphenol | 0.1 | 1000 | 0.1 | 100 | 10 | 1000 | 0.1 | 100 |
| | 2,6-dimethoxyphenol | 10 | 1000 | 10 | 1000 | 10 | 1000 | 10 | 1000 |

As shown in Table 6, Flavor Group 6 includes nine compounds that can impart a cooked, seasoning and/or fatty aroma to a beverage formed from the flavor system 12. The compounds of Flavor Group 6 are selected from the group consisting of 3-hydroxy-4,5-dimethyl-2(5H)-furanone, dimethyl sulfide, dimethyltrisulfide, 3-(methylthio)-1-propanol, 3-(methylthio)-1-propanal, 3-methyl-2-butene-1-thiol, (E)-2-nonenal, (E,E)-2,4-decadienal, (E,E)-2,4-nonadienal and combinations thereof. The range of each compound of Flavor Group 6 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (µg/l) is shown. However, in embodiments, when forming a beverage having the flavor of a whiskey, dimethyl sulfide, dimethyltrisulfide, and/or 3-methyl-2-butene-1-thiol may not be included in the flavor system. Moreover, each of the Flavor Group 6 compounds can be substituted for other compounds in the same group to achieve a similar aroma.

TABLE 6

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 6- (cooked, seasoning, fatty aroma) | 3-hydroxy-4,5-dimethyl-2(5H)-furanone | 0.1 | 25 | 0.5 | 25 | 0.1 | 5 | 0.1 | 5 |
| | dimethyl sulfide | 1 | 250 | 1 | 50 | 0 | 0 | 1 | 250 |
| | dimethyltrisulfide | 0.02 | 2 | 0.02 | 2 | 0 | 0 | 0.02 | 2 |
| | 3-(methylthio)-1-propanol | 250 | 10,000 | 250 | 10,000 | 250 | 10,000 | 100 | 5,000 |
| | 3-(methylthio)-1-propanal | 0.05 | 10 | 0.1 | 10 | 0.1 | 10 | 0.05 | 5 |
| | 3-methyl-2-butene-1-thiol | 0.001 | 1 | 0 | 0 | 0 | 0 | 0.001 | 1 |
| | (E)-2-nonenal | 1 | 100 | 1 | 100 | 1 | 100 | 1 | 100 |
| | (E,E)-2,4-decadienal | 1 | 100 | 1 | 100 | 1 | 100 | 1 | 100 |
| | (E,E)-2,4-nonadienal | 0.1 | 10 | 0.1 | 10 | 0.1 | 10 | 0.1 | 10 |

As shown in Table 7, Flavor Group 7 includes seven compounds that can impart a phenolic and/or medicinal aroma to a beverage formed from the flavor system 12. The compounds of Flavor Group 7 are selected from the group consisting of 4-ethylphenol, 4-methylphenol, 3-methylphenol, 2-methylphenol, 3-ethylphenol, 2-ethylphenol, phenol, and combinations thereof. The range of each compound of Flavor Group 7 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (µg/l) is shown. As shown, the compounds of Flavor Group 7 are not desirable for inclusion in wine or beer type beverages produced using the flavor system 12 described herein. Thus, the aroma compounds of Flavor Group 7 would not be used in flavor systems designed to form beverages having the flavor of a wine, beer or cider. Moreover, each of the Flavor Group 7 compounds can be substituted for other compounds in the same group to achieve a similar aroma.

TABLE 7

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 7- (phenolic, medicinal aroma) | 4-ethylphenol | 50 | 10,000 | 0 | 0 | 50 | 10,000 | 0 | 0 |
| | 4-methylphenol | 1 | 10,000 | 0 | 0 | 1 | 10,000 | 0 | 0 |
| | 3-methylphenol | 1 | 8,000 | 0 | 0 | 1 | 8,000 | 0 | 0 |
| | 2-methylphenol | 1 | 20,000 | 0 | 0 | 1 | 20,000 | 0 | 0 |
| | 3-ethylphenol | 1 | 5,000 | 0 | 0 | 1 | 5,000 | 0 | 0 |
| | 2-ethylphenol | 1 | 5,000 | 0 | 0 | 1 | 5,000 | 0 | 0 |
| | phenol | 50 | 20,000 | 0 | 0 | 50 | 20,000 | 0 | 0 |

As shown in Table 8, Flavor Group 8 includes eight compounds that can impart a sour taste to a beverage formed from the flavor system 12. The compounds of Flavor Group 8 are selected from the group consisting of tartaric acid, succinic acid, lactic acid, citric acid, galacturonic acid, pyruvic acid, malic acid, acetic acid, and combinations thereof. The range of each compound of Flavor Group 8 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (µg/l) is shown. In embodiments, the compounds of Flavor Group 8 may be used to form whiskey, beer, or wine type beverages. In other embodiments, the compounds of Flavor Group 8 may not desirable for inclusion in whiskey or beer type beverages produced using the flavor system 12 described herein—thus, in embodiments, the flavor compounds of Flavor Group 8 would only be included in flavor systems designed to form beverages having the flavor of wine. Moreover, each of the Flavor Group 8 compounds can be substituted for other compounds in the same group to form a flavor system 12 which produces a beverage having a similar taste.

TABLE 8

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 8- sour taste | tartaric acid | 10,000 | 10,000,000 | 300,000 | 10,000,000 | 0 | 0 | 10,000 | 500,000 |
| | succinic acid | 200,000 | 5,000,000 | 250,000 | 5,000,000 | 0 | 0 | 200,000 | 5,000,000 |
| | lactic acid | 200,000 | 7,500,000 | 300,000 | 7,500,000 | 0 | 0 | 200,000 | 7,500,000 |
| | citric acid | 1,000 | 7,500,000 | 1,000 | 7,500,000 | 0 | 0 | 10,000 | 7,500,000 |
| | galacturonic acid | 10,000 | 5,000,000 | 10,000 | 5,000,000 | 0 | 0 | 10,000 | 5,000,000 |
| | pyruvic acid | 10,000 | 1,000,000 | 10,000 | 1,000,000 | 0 | 0 | 10,000 | 1,000,000 |
| | malic acid | 10,000 | 1,000,000 | 10,000 | 1,000,000 | 0 | 0 | 10,000 | 1,000,000 |
| | acetic acid | 10,000 | 10,000,000 | 75,000 | 4,000,000 | 1E4 | 1E6 | 10,000 | 1,000,000 |

As shown in Table 9, Flavor Group 9 includes nine compounds that can impart a sweet taste to a beverage. The compounds of Flavor Group 9 are selected from the group consisting of glycerol, glucose, fructose, L-proline, saccharose, 5-hydroxymethylfufural, 5-ethoxymethylfufural, 5-methoxymethylfufural, 5-acetoxymethylfufural, and combinations thereof. The range of each compound of Flavor Group 9 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (µg/l) is shown. Moreover, each of the Taste Group 2 compounds can be substituted for other compounds in the same group to form a flavor system which produces a beverage having a similar taste.

TABLE 9

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low μg/l | high μg/l | low μg/l | high μg/l | low μg/l | high μg/l | low μg/l | high μg/l |
| Flavor Group 9- (sweet taste) | glycerol | 5,000 | 50,000,000 | 2,500,000 | 50,000,000 | 2,000,000 | 10,000,000 | 50,000 | 5,000,000 |
| | glucose | 20,000 | 5,000,000 | 20,000 | 500,000 | 0 | 0 | 20,000 | 500,000 |
| | fructose | 100,000 | 10,000,000 | 100,000 | 10,000,000 | 0 | 0 | 100,000 | 10,000,000 |
| | L-proline | 100,000 | 10,000,000 | 100,000 | 10,000,000 | 0 | 0 | 100,000 | 10,000,000 |
| | saccharose | 10,000 | 10,000,000 | 500,000 | 10,000,000 | 0 | 0 | 500,000 | 10,000,000 |
| | 5-hydroxymethylfufural | 0 | 50,000 | 0 | 0 | 0 | 50,000 | 0 | 0 |
| | 5-ethoxymethylfufural | 0 | 1,000 | 0 | 0 | 0 | 1,000 | 0 | 0 |
| | 5-methoxymethylfufural | 0 | 1,000 | 0 | 0 | 0 | 1,000 | 0 | 0 |
| | 5-acetoxymethylfufural | 0 | 1,000 | 0 | 0 | 0 | 1,000 | 0 | 0 |

As shown in Table 10, Flavor Group 10 includes eight compounds that can impart a salty and/or bitter taste to a flavor system for forming a beverage. The compounds of Flavor Group 10 are selected from the group consisting of potassium, magnesium, sodium, chloride, phosphate, ammonium, sulfate, calcium, and combinations thereof. The range of each compound of Flavor Group 10 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (μg/l) is shown. As shown, the compounds of Flavor Group 10 are not desirable for inclusion in whiskey type beverages produced using the flavor system 12 described herein. Moreover, each of the Flavor Group 10 compounds can be substituted for other compounds in the same group to form a flavor system 12 which produces a beverage having a similar taste.

TABLE 10

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low μg/l | high μg/l | low μg/l | high μg/l | low μg/l | high μg/l | low μg/l | high μg/l |
| Flavor Group 10- (Salty, Bitter Taste) | potassium | 10,000 | 10,000,000 | 300,000 | 10,000,000 | 0 | 0 | 10,000 | 1,000,000 |
| | magnesium | 5,000 | 2,000,000 | 10,000 | 2,000,000 | 0 | 0 | 5,000 | 2,000,000 |
| | sodium | 500 | 5,000,000 | 20,000 | 5,000,000 | 0 | 0 | 500 | 500,000 |
| | chloride | 20000 | 500,000 | 20,000 | 500,000 | 0 | 0 | 20,000 | 500,000 |
| | phosphate | 100000 | 5,000,000 | 100,000 | 5,000,000 | 0 | 0 | 100,000 | 5,000,000 |
| | ammonium | 50 | 100,000 | 50 | 100,000 | 0 | 0 | 500 | 100,000 |
| | sulfate | 10000 | 500,000 | 10,000 | 500,000 | 0 | 0 | 10,000 | 500,000 |
| | calcium | 5,000 | 500,000 | 10,000 | 500,000 | 0 | 0 | 25,000 | 500,000 |

As shown in Table 11, Flavor Group 11 includes twenty-two compounds that can impart an astringent mouth feel to a flavor system 12 for forming a beverage. The compounds of Flavor Group 11 are selected from the group consisting of tannic acid, trans aconitic acid, cis-aconitic acid, ellagic acid, caftaric acid, caffeic acid, castalagin, coutaric acid, fertaric acid, gallic acid, quercetin-3-O-galactoside, syringetin-3-O-glucoside, quercetin-3-O-glucuronide, kaempferol-3-O-glucoside, isorhamnetinglucoside, grape seed extract, agmatine, cytidine, gamma-aminobutyric acid, hordenine, lyoniresinol, oak extract, and combinations thereof. The range of each compound of Flavor Group 11 that can be included in the flavor system 12 for forming any beverage, the range of each compound in a flavor system for forming a wine-like beverage, the range of each compound in a flavor system 12 for forming a whiskey-like beverage and the range of each compound in a flavor system 12 for forming a beer-like beverage in micrograms per liter (μg/l) is shown. In embodiments, the compounds of Flavor Group 11 may be included in beverages having the flavor of beer, wine, or whiskey. In other embodiments, the compounds of Flavor Group 11 may not be desirable for inclusion in beverages having the flavor of beer as produced using the flavor system 12. Moreover, each of the Flavor Group 11 compounds can be substituted for other compounds in the same group to form a flavor system 12 which produces a beverage having a similar taste.

tifidolglycoside, and combinations thereof. The range of each compound of Flavor Group 12 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (μg/l) is shown. In embodi-

TABLE 11

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low μg/l | high μg/l | low μg/l | high μg/l | low μg/l | high μg/l | low μg/l | high μg/l |
| Flavor Group 11- (Astringent mouth feel) | tannic acid | 1,000 | 150,000 | 30,000 | 150,000 | 30000 | 150000 | 1000 | 100000 |
| | trans aconitic acid | 500 | 25,000 | 500 | 25,000 | 500 | 25000 | 500 | 25000 |
| | cis-aconitic acid | 100 | 25000 | 100 | 10000 | 100 | 25000 | 100 | 25000 |
| | ellagic acid | 200 | 30000 | 200 | 30000 | 200 | 30000 | 0 | 0 |
| | caftaric acid | 1000 | 100000 | 1000 | 100000 | 0 | 0 | 0 | 0 |
| | caffeic acid | 1000 | 100000 | 1000 | 100000 | 0 | 0 | 0 | 0 |
| | castalagin | 50 | 5000 | 50 | 5000 | 0 | 0 | 0 | 0 |
| | coutaric acid | 100 | 30000 | 100 | 30000 | 0 | 0 | 0 | 0 |
| | fertaric acid | 500 | 50000 | 500 | 50000 | 0 | 0 | 0 | 0 |
| | gallic acid | 50 | 250000 | 50 | 250000 | 0 | 0 | 50 | 50000 |
| | quercetin-3-O-galactoside | 100 | 100000 | 100 | 100000 | 0 | 0 | 0 | 0 |
| | syringetin-3-O-glucoside | 50 | 20000 | 50 | 20000 | 0 | 0 | 0 | 0 |
| | quercetin-3-O-glucuronide | 100 | 100000 | 100 | 100000 | 0 | 0 | 0 | 0 |
| | kaempferol-3-O-glucoside | 50 | 10000 | 50 | 10000 | 0 | 0 | 0 | 0 |
| | isorhamnetinglucoside | 50 | 20000 | 50 | 20000 | 0 | 0 | 0 | 0 |
| | grape seed extract | 1000000 | 10000000 | 1000000 | 10000000 | 0 | 0 | 0 | 0 |
| | agmatine | 1000 | 150000 | 0 | 0 | 0 | 0 | 1000 | 150000 |
| | cytidine | 1000 | 500000 | 0 | 0 | 0 | 0 | 1000 | 500000 |
| | gamma-aminobutyric acid | 5000 | 100000 | 0 | 0 | 0 | 0 | 5000 | 100000 |
| | hordenine | 200 | 20000 | 0 | 0 | 0 | 0 | 200 | 20000 |
| | lyoniresinol | 1000 | 500000 | 0 | 0 | 1000 | 500,000 | 0 | 0 |
| | Oak extract | 1000000 | 5000000 | 1000000 | 5000000 | 1000000 | 5E6 | 0 | 0 |

As shown in Table 12, Flavor Group 12 includes ten compounds that can impart a bitter taste to a flavor system 12 for forming a beverage. The compounds of Flavor Group 12 are selected from the group consisting of hops extract, tetra-iso-extract 10%, rho-iso-extract 10%, isomerized hop extract 30%, cis-isohumolone, trans-isohumolone, cis-isocohumulone, trans-isocohumulone, isoadhumulone, comul- ments, the compounds of Flavor Group 12 may not be desirable for inclusion in wine and whiskey type beverages produced using the flavor system 12 described herein. Moreover, each of the Flavor Group 12 compounds can be substituted for other compounds in the same group to form a flavor system 12 which produces a beverage having a similar taste.

TABLE 12

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low μg/l | high μg/l | low μg/l | high μg/l | low μg/l | high μg/l | low μg/l | high μg/l |
| Flavor Group 12- (bitter taste) | hops extract | 1,000,000 | 30,000,000 | 0 | 0 | 0 | 0 | 1,000,000 | 30,000,000 |
| | Tetra-Iso-Extract 10% | 25,000 | 650,000 | 0 | 0 | 0 | 0 | 25,000 | 650,000 |
| | Rho-Iso-Extract 10% | 25,000 | 650,000 | 0 | 0 | 0 | 0 | 25,000 | 650,000 |
| | Isomerized hop extract 30% | 10,000 | 250,000 | 0 | 0 | 0 | 0 | 10,000 | 250,000 |
| | cis-isohumolone | 1000 | 150000 | 0 | 0 | 0 | 0 | 1000 | 150000 |

TABLE 12-continued

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| | trans-isohumolone | 500 | 50000 | 0 | 0 | 0 | 0 | 100 | 50000 |
| | cis-isocohumulone | 1000 | 150000 | 0 | 0 | 0 | 0 | 1000 | 150000 |
| | trans-isocohumulone | 500 | 50000 | 0 | 0 | 0 | 0 | 500 | 50000 |
| | isoadhumulone | 500 | 100000 | 0 | 0 | 0 | 0 | 500 | 100000 |
| | comultifidolglycoside | 1 | 10000 | 0 | 0 | 0 | 0 | 1 | 10000 |

As shown in Table 13, Flavor Group 13 includes seventeen compounds that can impart umami and/or mouth feel to a flavor system 12 for forming a beverage. The compounds of Flavor Group 13 are selected from the group consisting of carrageenan, whey protein, monosodium glutamate, maltodextrin, lauric acid, myristic acid, palmitic acid, stearic acid, palmitolic acid, oleic acid, linoleic acid, linolenic acid, ethyl laurate, ethyl myristate, ethyl palmitate, ethyl palmitoleate, ethyl stearate, and combinations thereof. The range of each compound of Flavor Group 13 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (µg/l) is shown. As shown, in some embodiments, the compounds of Flavor Group 13 may not desirable for inclusion in wine and/or whiskey type beverages produced using the flavor system 12 described herein. Moreover, each of the Flavor Group 13 compounds can be substituted for other compounds in the same group to form a flavor system 12 which produces a beverage having a similar taste.

In addition, the flavor system 12 can also include ethanol so as to produce an alcoholic beverage therefrom or ethanol can be added to the liquid base in addition to the flavor system. When an alcoholic beverage is desired, ethanol can be included in an amount ranging from about 0 microgram/liter (µg/l) to about 474,000,000 µg/l (e.g., about 1000 µg/l to about 400,000,000 µg/l, about 10,000 to about 300,000,000 µg/l, about 100,000 µg/l to about 20,000,0000 µg/l, about 200,000 µg/l to about 10,000,000 µg/l or about 300,000 µg/l to about 900,000 µg/l).

Moreover, ethanol can be added in an amount sufficient to produce a beverage having an alcohol content ranging from about 0.1% alcohol by volume to about 80% alcohol by volume. For example, a wine as produced herein can include ethanol in an amount sufficient to produce a wine-line beverage having an alcohol content of about 0.1% alcohol by volume to about 25% alcohol by volume. A whiskey-like beverage can include ethanol in an amount sufficient to produce a whiskey-like beverage having an alcohol content of about 50% alcohol by volume to about 70% alcohol by volume and a beer-like beverage can include ethanol in an amount sufficient to have an alcohol content of about 0.1% alcohol by volume to about 20% alcohol by volume.

By including one or more (e.g., two or more, three or more, four or more, five or more, six or more, etc.) com-

TABLE 13

| Category (descriptor) | Compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 13- (Umami taste, Mouthfeel) | carrageenan | 50,000 | 1,500,000 | 0 | 0 | 0 | 0 | 50,000 | 15,00,000 |
| | whey protein | 10,000 | 250,000 | 0 | 0 | 0 | 0 | 10,000 | 250,000 |
| | monosodium glutamate | 500 | 750,000 | 0 | 0 | 0 | 0 | 30,000 | 750,000 |
| | maltodextrin | 3,000,000 | 70,000,000 | 0 | 0 | 0 | 0 | 3,000,000 | 70,000,000 |
| | lauric acid | 10 | 100000 | 0 | 0 | 10 | 100000 | 0 | 0 |
| | myristic acid | 10 | 100000 | 0 | 0 | 10 | 100000 | 0 | 0 |
| | palmitic acid | 100 | 100000 | 0 | 0 | 100 | 100000 | 0 | 0 |
| | stearic acid | 10 | 10000 | 0 | 0 | 10 | 10000 | 0 | 0 |
| | palmitolic acid | 100 | 100000 | 0 | 0 | 100 | 100000 | 0 | 0 |
| | oleic acid | 10 | 10000 | 0 | 0 | 10 | 10000 | 0 | 0 |
| | linoleic acid | 10 | 10000 | 0 | 0 | 10 | 10000 | 0 | 0 |
| | linolenic acid | 10 | 10000 | 0 | 0 | 0 | 10000 | 0 | 0 |
| | ethyl laurate | 10 | 100000 | 0 | 0 | 10 | 100000 | 0 | 0 |
| | ethyl myristate | 10 | 100000 | 0 | 0 | 10 | 100000 | 0 | 0 |
| | ethyl palmitate | 10 | 100000 | 0 | 0 | 10 | 100000 | 0 | 0 |
| | ethyl palmitoleate | 1 | 10000 | 0 | 0 | 1 | 10000 | 0 | 0 |
| | ethyl stearate | 10 | 10000 | 0 | 0 | 10 | 10000 | 0 | 0 | pounds from each of the aroma and/or flavor groups as described above, the flavor system 12 can be tailored to provide a flavor system 12 which mimics the flavor of various nature craft identical beers, wines, liquors, including whiskey, and mixed beverages. The choice of flavor compounds and the amount included in the flavor system allows a user and/or manufacturer to adjust the flavor of the flavor system 12 and resulting beverage 14.

Preferably, a beverage having a wine taste and/or mouth feel includes at least one (e.g., at least two or at least three) compound from flavor group 4 (fruity flavor, at least one (e.g., at least two or at least three) compound from flavor group 5 (smoky, coconut, woody flavor), at least one (e.g., at least two or at least three) compound from flavor group 8 (sour flavor), and at least one (e.g., at least two or at least three) compound from flavor group 11 (astringent mouth feel). In other embodiments, the beverage having a wine flavor can include at least one (e.g., at least two or at least three) compound from one or more of the remaining flavor groups.

Preferably, a beverage having a beer taste and/or mouth feel includes at least one (e.g., at least two, at least three, or at least four) compound from flavor group 2 (malty, buttery, sweet flavor), at least one (e.g., at least two, at least three, or at least four) compound from flavor group 3 (floral, honey flavor) and at least one (e.g., at least two, at least three, or at least four) compound from flavor group 12 (bitter flavor). In other embodiments, the beverage having a beer flavor can include at least one (e.g., at least two, at least three, or at least four) compound from one or more of the remaining flavor groups.

Preferably, a beverage having a whiskey taste and/or mouth feel includes at least one (e.g., at least two or at least three) compound from flavor group 4 (fruity flavor), at least one (e.g., at least two or at least three) compound from flavor group 5 (smoky, coconut, woody flavor), at least one (e.g., at least two or at least three) compound from flavor group 7 (phenolic, medicinal) and at least one (e.g., at least two or at least three) compound from flavor group 11 (astringent mouth feel). In other embodiments, the beverage having a whiskey flavor can include at least one (e.g., at least two or at least three) compound from one or more of the remaining flavor groups.

The examples provided below are exemplary and are not meant to limit any aspects of the embodiments disclosed herein.

Example 1

A red wine having the flavor of a Cabernet Sauvignon can be made by combining 3,000 µg/l of octanoic acid, 2,500 µg/l of 2-methylpropanoic acid, 5,000 µg/l of 3-methylbutanoic acid, 5,000 µg/l of 2-methylbutanoic acid, 2,000 µg/l of hexanoic acid, 150,000 µg/l of 3-methylbutanol, 150,000 µg/l of 2-methylbutanol, 1,000 g/l of 2,3-butanedione, 500 µg/l of vanilline, 5,000 µg/l of 2,3-pentanedione, 100 µg/l of furaneol, 150 µg/l of 2-phenylacetic acid, 2,000 µg/l of acetaldehyde, 100 µg/l of ethyl butyrate, 100 µg/l of ethyl hexanoate, 10 µg/l of ethyl-3-methylbutyrate, 10 µg/l of ethyl-2-methylbutyrate, 1 µg/l of (E)-b-damascenone, 500 µg/l of whiskey lactone, 30 µg/l of 2-methoxyphenol, 20 µg/l of 3-allyl-2-methoxyphenol, 4,000 µg/l of 3-(methylthio)-1-propanol, 2,000 µg/l of tartaric acid, 1,000,000 of succinic acid, 750,000 µg/l of acetic acid, 15,000,000 µg/l of glycerol, 2,000,000 µg/l of L-proline, 1,000,000 µg/l of potassium, 80,000 µg/l of tannic acid, 2,000,000 µg/l of oak extract, 10,000,000 µg/l of ethanol and water. Optionally, colorants can be added to provide a wine beverage having a pleasing color.

Example 2

An American style whiskey can be made by combining 1,000,000 µg/l of 3-methylbutanol, 500,000 µg/l of 2-methylbutanol, 5,000 µg/l of vanilline, 500 µg/l of 3-methylbutanal, 10,000 µg/l of 2-phenylehtanol, 1,000 µg/l of 2-phenylacetic acid, 3,000 µg/l of 2-phenylethyl acetate, 500 µg/l of ethyl butyrate, 10,000 µg/l of ethyl octanoate, 200 µg/l of ethyl-2-methylbutyrate, 10 µg/l of (E)-b-damascenone, 2,500 µg/l of 3-methylbutyl acetate, 15,000 µg/l of 1,1-diethoxyethane, 5,000 µg/l of whiskey lactone, 50 µg/l of 2-methoxyphenol, 400 µg/l of 4-allyl-2-methoxyphenol, 300 µg/l of 5-pentyldihydrofuran-2(3H)-one, 15 µg/l of 4-methyl-2-methoxyphenol, 5 µg/l of 5-hexyldihydrofuran-2(3H)-one, 40 µg/l of (E,E)-2,4-decadienal, 5 µg/l of (E,E) 2,4-nonadienal, 150 µg/l of 4-ethylphenol, 10 µg/l of 4-methylphenol, 5,000,000 µg/l of glycerol, 100,000 µg/l of tannic acid, 4,000,000 µg/l of oak extract, 316,000,000 µg/l of ethanol and water.

Example 3

A pilsner-type beer can be made by combining (E)-b-damascenone in an amount of about 3 µg/l, 2-methylbutanoic acid in an amount of about 2,000 µg/l, 2-phenylethanol in an amount of about 10,000 µg/l, 3-(methylthio) propanol in an amount of about 1,000 µg/l, 3-methylbutanoic acid in an amount of about 2000 µg/l, 3-methylbutanal in an amount of about 200 µg/l, 3-methylbutanol in an amount of about 50,000 µg/l, dimethyl sulfide in an amount of about 150 µg/l, ethyl butyrate in an amount of about 200 µg/l, ethyl hexanoate in an amount of about 200 µg/l, ethyl octanoate in an amount of about 150 µg/l, furaneol in an amount of about 500 µg/l, 2-phenylacetic acid in an amount of about 500 µg/1,3-hydroxy-4,5-dimethyl-2(5H)-furanone in an amount of about 5 µg/l, 3-methylbutanol in an amount of about 50,000 µg/l, 2-methylbutanol in an amount of about 50,000 µg/l, ethylfuraneol in an amount of about 100 µg/l, linalool in an amount of about 300 µg/l, 4-allyl-2-methoxyphenol in an amount of about 150 µg/l, 3-(methylthio)-1-propanal in an amount of about 5 µg/l, citric acid in an amount of about 400,000 µg/l, saccharose in an amount of about 1,500,000 µg/l, potassium in an amount of about 1,500,000 µg/l, hops extract in an amount of about 5,000,000 µg/l, isomerized hops extract 30% in an amount of about 100,000 µg/l, monosodium glutamate in an amount of about 100,000 µg/l, ethanol in an amount of about 37,500,000 µg/l and water.

Example 4

A light pilsner-type beer can be made by combining (E)-b-damascenone in an amount of about 3 µg/l, 2-methylbutanoic acid in an amount of about 2000 µg/l, 2-phenylethanol in an amount of about 10,000 µg/l, 3-(methylthio) propanol in an amount of about 1,000 µg/l, 3-methylbutanoic acid in an amount of about 2,000 µg/l, 3-methylbutanal in an amount of about 200 µg/l 3-methylbutanol in an amount of about 50,000 dimethyl sulfide in an amount of about 150 µg/l, ethyl butyrate in an amount of about 200 µg/l, ethyl hexanoate in an amount of about 200 µg/l, ethyl octanoate in an amount of about 150 µg/l, furaneol in an amount of about 500 µg/l, 2-phenylacetic acid in an amount of about 500 μg/1,3-hydroxy-4,5-dimethyl-2 (5H)-furanone in an amount of about 5 μg/l, 3-methylbutanol in an amount of about 50,000 μg/l, 2-methylbutanol in an amount of about 50,000 ethylfuraneol in an amount of about 100 μg/l, linalool in an amount of about 300 μg/l,4-allyl-2-methoxyphenol in an amount of about 150 μg/l, 3-(methylthio)-1-propanal in an amount of about 5 μg/l, citric acid in an amount of about 400,000 μg/l, saccharose in an amount of about 1,500,000 μg/l, potassium in an amount of about 1,500,000 μg/l, hops extract in an amount of about 5,000,000 μg/l, isomerized hops extract 30% in an amount of about 100,000 μg/l, monosodium glutamate in an amount of about 100,000 μg/l, ethanol in an amount of about 33,100,000 μg/l and water.

Advantageously, the beverages created using the flavor system and method described herein have fewer calories than a traditionally brewed and/or fermented beverage having substantially the same flavor characteristics. As shown in Table 14, the pilsner-type of Example 3 has fewer calories than commercially brewed and fermented beers. The calorie count for the commercially brewed beers was obtained from www.beer100.com/beercalorie and is based on a 12 ounce beverage. The calorie count of the beer of Example 3 is based on the following: ethanol: 7 kcal/g and carbohydrates: 4 kcal/g.

TABLE 14

| Beer Brand | total kcal | alcohol kcal | carbs kcal |
| --- | --- | --- | --- |
| BUDWEISER | 145 | 97 | 42.4 |
| MILLER GENUINE DRAFT | 143 | 91 | 52.4 |
| SAM ADAMS BOSTON LAGER | 160 | 92 | 72 |
| Pilsner-type beer of Example 3 | 100 | 92 | 8 |

As shown in Table 15, the light pilsner-type beer of Example 4 has fewer calories than commercially brewed and fermented light beers. The calorie count for the commercially brewed beers was obtained from www.beer100.com/beercalorie and is based on a 12 ounce beverage. The calorie count of the beer of Example 4 is based on the following: ethanol: 7 kcal/g and carbohydrates: 4 kcal/g.

TABLE 15

| Beer Brand | total kcal | alcohol kcal | carbs kcal |
| --- | --- | --- | --- |
| BUD LIGHT | 110 | 81 | 26.4 |
| MILLER LITE | 96 | 81 | 12.8 |
| Light pilsner-type beer of Example 4 | 89 | 81 | 8 |

As shown both the pilsner-type beverage of Example 3 and the light pilsner-type beverage of Example 4 provide a beverage having at least 7% fewer calories than a conventionally brewed and/or fermented beverage having a similar flavor. Preferably, the beverages formed as described herein will have at least 5% fewer calories (e.g., at least 10% fewer calories, at least 15% fewer calories, at least 20% fewer calories, at least 25% fewer calories) than traditionally brewed and/or fermented beverages having similar flavors.

Figure 4:
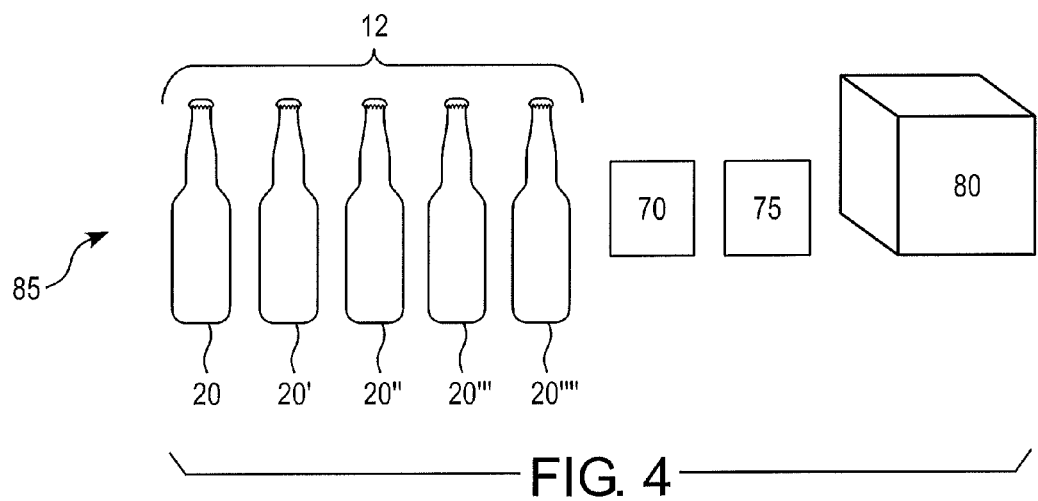
FIG. 4 is an illustration of a kit including the flavor system as described herein.

As shown in FIG. 4, a kit 85 for making a flavored beverage includes a flavor system 12 including a quantity of each of a plurality of flavor and/or aroma compounds 20, 20', 20", 20''', 20'''', a quantity of yeast 70, a quantity of sugar 75 and a container 80. Preferably, the kit includes at least one flavor compound from each of the Aroma Compound Groups and Taste Compound Groups described above. The container 80 is sized to contain the flavor system 12, yeast 80, sugar 75 and a predetermined quantity of water (not shown). The kit 85 is operable to form a beverage having the flavors and/or aromas of a wine. The sugar 75 can be table sugar (sucrose), which is also known as priming sugar. Preferably, the plurality of flavor and/or aroma compounds can be mixed in various combinations and amounts to form a beer-like, wine-like, whiskey-like and/or cider like beverage.

The kit 85 can include instructions for combining the various flavor and/or aroma compounds 20, 20', 20", 20''', 20'''' in different combinations and quantities to form a variety of different beverages which mimic the taste of wine, beer and liquors. Preferably, the instructions also indicate the necessary time and conditions for forming a carbonated beverage using the kit 85. By mixing the desired components of the flavor system 12 along with yeast 70, sugar 75 and water in the container 80 and maintaining the contents at a temperature greater than about 70° F. for about 2 to about 10 days, preferably about 4 to about 7 days, to create a carbonated beverage having the desired flavor and/or aroma characteristics.

For example, a beer-like beverage can be formed by placing an appropriate amount of a flavor system configured to create a beverage having the flavor of beer, ethanol, maltodextrins, hop extract, 0.25 teaspoon yeast, 2.5 teaspoons of sugar and 1 liter of water in a sealed container for about one week at a temperature of about 72° F.±4° F. Preferably, the beverage is created in less than about 10 days. By using yeast and sugar, carbonation is created in the beverage.

An apparatus 21 for making a flavored beverage comprises a plurality of reservoirs 22, each reservoir configured to hold an individual flavor or aroma compound 20, 20', 20", 20''', 20'''' and including an outlet 23, a water source 90 operable to supply water, a mixing unit 30 operable to mix water from the water source 90 with a quantity of one or more flavor or aroma compounds 20, 20', 20", 20''', 20'''' to form a beverage, a source of pressurized gas 35, the source of pressurized gas 35 being operable to deliver pressurized gas to the mixing unit 30 so as to provide carbonation to the beverage, and a dispensing unit 40 operable to dispense the beverage from the apparatus 21 via an outlet 42 into a container 45.

Figure 3:
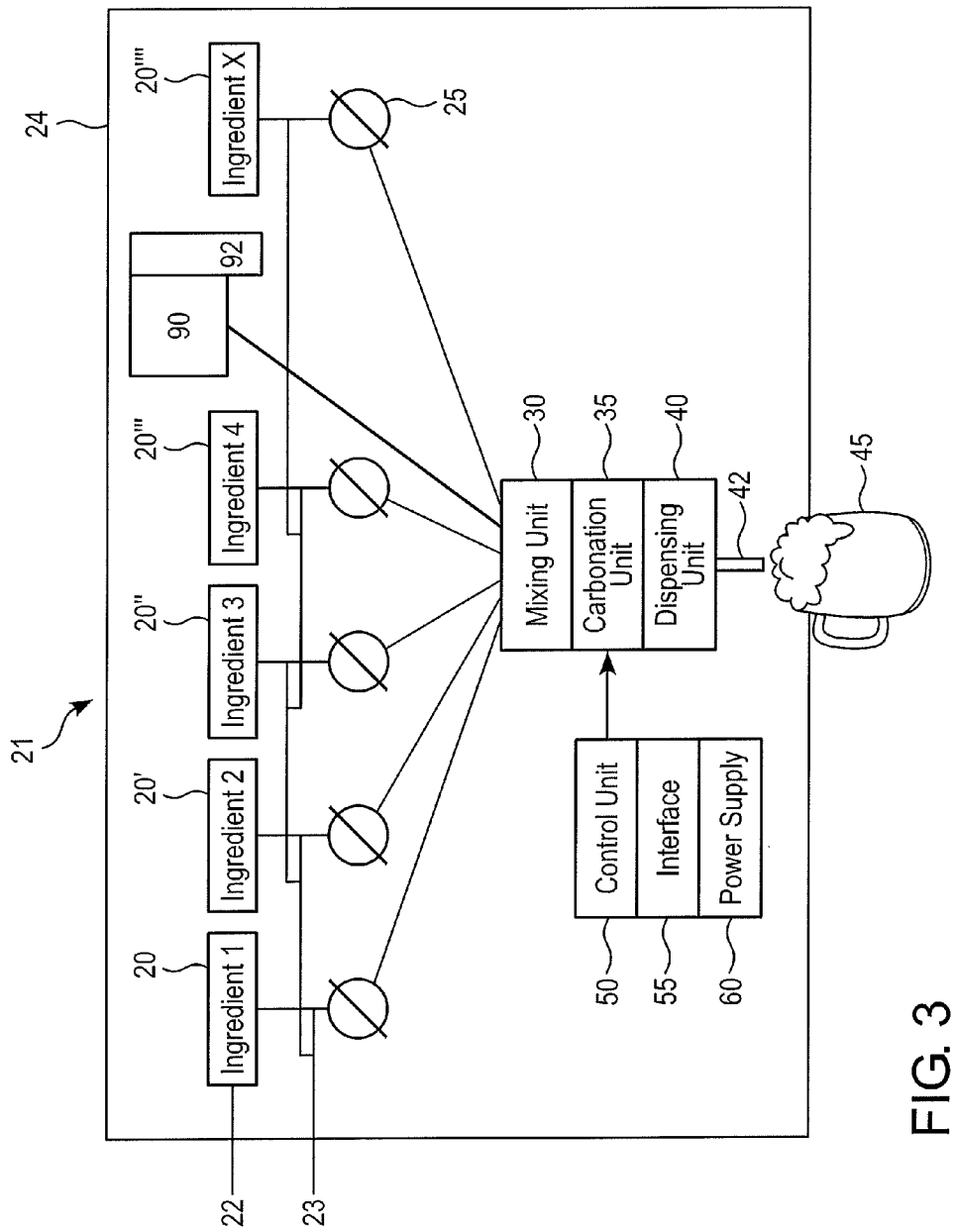
FIG. 3 is a diagram of an apparatus for making a beverage using a flavor system as described herein.

As shown in FIG. 3, the apparatus 21 for making a beverage includes a housing 24 which houses the mechanical and electronic components of the apparatus 21. Preferably, the housing 24 can be formed of plastic and/or metal.

The apparatus 21 can be a compact, counter sized device or a larger device for use in restaurants, bars or other establishments which serve beverages.

Preferably, as shown in FIG. 3, the water reservoir 90 is used to supply the water necessary for making a serving of a beverage. Alternatively, instead of a water reservoir 90, the apparatus 21 can include a water line (not shown) connected to an external water supply source. In one embodiment, the water reservoir 90 or the water line can be cooled by a cooling system 92 so as to provide a chilled beverage if desired. The cooling system 92 can include a fan or other apparatus which is operable to cool the water.

Also preferably, the source of pressurized gas canister 35 is used to supply carbonation if desired. Preferably, the source of pressurized gas canister 35 is replaceable. The source of pressurized gas canister 35 preferably includes carbon dioxide. However, in an alternative embodiment, the source of pressurized gas canister 35 can include nitrogen. Preferably, the amount of carbonation provided by the source of pressurized gas canister 35 can be controlled depending on the preference as to the level of carbonation of the adult consumer. For example, the adult consumer can use input a desired level of carbonation into a control system 50 via a user interface 55, which can be a touch screen or other suitable input device. The control system 50 can control the amount of pressurized gas to be released from the source of pressurized gas canister 35.

The control system 50 and the user interface 55, can also allow an adult consumer to input system requirements including the desired amount of carbonation, desired alcohol content, chilling of the drink, mixing of the drink, flavor and/or aroma compounds desired in the beverage, and other such functions. The apparatus 21 can also include a power supply 60 operable to provide power to the apparatus 22 during use. The power supply 60 can include a battery or an AC adapter. The control system 50 can include manual or automatic controls 25 for controlling the amount of flavor and/or aroma compounds to be released from each of the reservoirs 22.

Preferably, the apparatus 21 is able to prepare a drink within about 5 minutes or less upon demand and without the need for a bartender or other human intervention.

In use, the adult consumer can activate the apparatus 21 using the user interface 55 of the control unit 50 and await dispensing of their beverage. Water from the water supply 90 and optionally pressurized gas from the pressurized gas source 35 are dispensed simultaneously or in series to the mixing unit 30 where the pressurized gas and water are mixed with the flavor and/or aroma compounds 20, 20', 20", 20''' of the flavor system and optionally alcohol.

The method and apparatus described herein can be modified for home use or on a larger scale in manufacturing facilities. Thus, instead of brewing a variety of different beers, a manufacturer could brew a single low flavor beer and modify the taste and aroma by using the low flavor beer as a main liquid in the apparatus 21 and adding different flavor systems thereto to provide a variety of different beers. In addition, since the liquid base is a low flavor beer, the addition of a flavor system thereto can provide a full flavor beer having fewer calories and a lower alcohol content than conventionally brewed full flavor beers.

In this specification, the word "about" is often used in connection with numerical values to indicate that mathematical precision of such values is not intended. Accordingly, it is intended that where "about" is used with a numerical value, a tolerance of ±10% is contemplated for that numerical value.

While the foregoing describes in detail a flavor system and method for forming a beverage with reference to a specific embodiment thereof, it will be apparent to one skilled in the art that various changes and modifications and equivalents to the flavor system and method may be employed, which do not materially depart from the spirit and scope of the invention.

We claim:

1. A method of making an alcoholic beverage having the flavor of whiskey, the method comprising:
adding about 100,000 µg/l to about 5,000,000 µg/l of 3-methylbutanol, about 100,000 µg/l to about 5,000,000 µg/l of 2-methylbutanol, about 100 µg/l to about 25,000 µg/l of vanilline, about 20 µg/l to about 5,000 µg/l of 3-methylbutanal, about 5,000 µg/l to about 200,000 µg/l of 2-phenylethanol, about 10 µg/l to about 1,000 µg/l of 2-phenylacetic acid, about 100 µg/l to about 10,000 µg/l of 2-phenylethyl acetate, about 100 µg/l to about 5,000 µg/l of ethyl butyrate, about 500 µg/l to about 25,000 µg/l of ethyl octanoate, about 10 µg/l to about 500 µg/l of ethyl-2-methylbutyrate, about 1 µg/l to about 100 µg/l of (E)-b-damascenone, about 500 µg/l to about 25,000 µg/l of 3-methylbutyl acetate, about 2,000 µg/l to about 100,000 µg/l of 1,1-diethoxyethane, about 100 µg/l to about 50,000 µg/l of whiskey lactone, about 10 µg/l to about 10,000 µg/l of 2-methoxyphenol, about 10 µg/l to about 1,000 µg/l of 4-allyl-2-methoxyphenol, about 10 µg/l to about 500 µg/l of 5-pentyldihydrofuran-2(3H)-one, about 10 µg/l to about 10,000 µg/l of 4-methyl-2-methoxyphenol, about 1 µg/l to about 70 µg/l of 5-hexyldihydrofuran-2(3H)-one, about 1 µg/l to about 100 µg/l of (E,E)-2,4-decadienal, about 0.1 µg/l to about 10 µg/l of (E,E)-2,4-nonadienal, about 50 µg/l to about 10,000 µg/l of 4-ethylphenol, about 1 µg/l to about 10,000 µg/l of 4-methylphenol, about 2,000,000 µg/l to about 10,000,000 µg/l of glycerol, about 30,000 µg/l to about 150,000 µg/l of tannic acid, about 1,000,000 µg/l to about 5,000,000 µg/l of oak extract, and about 1,000 µg/l to about 474,000,000 µg/l of ethanol to a quantity of water so as to form an alcoholic beverage having the flavor of whiskey.

2. The method of claim 1 wherein about 1,000,000 µg/l of 3-methylbutanol, about 500,000 µg/l of 2-methylbutanol, about 5,000 µg/l of vanilline, about 500 µg/l of 3-methylbutanal, about 10,000 µg/l of 2-phenylethanol, about 1,000 µg/l of 2-phenylacetic acid, about 3,000 µg/l of 2-phenylethyl acetate, about 500 µg/l of ethyl butyrate, about 10,000 µg/l of ethyl octanoate, about 200 µg/l of ethyl-2-methylbutyrate, about 10 µg/l of (E)-b-damascenone, about 2,500 µg/l of 3-methylbutyl acetate, about 15,000 µg/l of 1,1-diethoxyethane, about 5,000 µg/l of whiskey lactone, about 50 µg/l of 2-methoxyphenol, about 400 µg/l of 4-allyl-2-methoxyphenol, about 300 µg/l of 5-pentyldihydrofuran-2(3H)-one, about 15 µg/l of 4-methyl-2-methoxyphenol, about 5 µg/l of 5-hexyldihydrofuran-2(3H)-one, about 40 µg/l of (E,E)-2,4-decadienal, about 5 µg/l of (E,E)-2,4-nonadienal, about 150 µg/l of 4-ethylphenol, about 10 µg/l of 4-methylphenol, about 5,000,000 µg/l of glycerol, about 100,000 µg/l of tannic acid, and about 4,000,000 µg/l of oak extract are added to the quantity of water.

3. The method of claim 1, wherein about 316,000,000 µg/l of ethanol is added to the quantity of water.

4. The method of claim 1, further comprising adding about 3,000 µg/l to about 300,000 µg/l of acetaldehyde, about 50 µg/l to about 2,500 µg/l of ethyl-2-methylpropanoate, about 100 µg/l to about 10,000 µg/l of ethyl hexanoate, about 10 µg/l to about 1,000 µg/l of ethyl-3-methylbutyrate, about 10 µg/l to about 500 µg/l of ethyl-2-methylbutyrate, about 1 µg/l to about 100 µg/l of trans-ethyl cinnamate, about 10 µg/l to about 1,000 µg/l of ethyl-3-phenylpropanoate, about 100 µg/l to about 100,000 µg/l of ethyl decanoate, about 50 µg/l to about 5,000 µg/l of ethyl propanoate, about 5 µg/l to about 5,000 µg/l of 4-ethyl-2-methoxyphenol, about 1 µg/l to about 500 µg/l of 4-propyl-2-methoxyphenol, about 10 µg/l to about 1,000 µg/l of 2-methoxy-5-methylphenol, about 10 µg/l to about 1,000 µg/l of 2,6-dimethoxyphenol, about 1 µg/l to about 8,000 µg/l of 3-methylphenol, about 1 µg/l to about 20,000 µg/l of 2-methylphenol, about 50 µg/l to about 20,000 µg/l of phenol, about 1 µg/l to about 5,000 µg/l of 3-ethylphenol, about 1 µg/l to about 5,000 µg/l of 2-ethylphenol, about 500 µg/l to about 2,2500 µg/l of trans aconitic acid, about 100 µg/l to about 25,000 µg/l of cis-aconitic acid, about 200 µg/l to about 30,000 µg/l of ellagic acid, about 1,000 µg/l to about 500,000 µg/l of lyoniresinol, about 5 µg/l to about 200 µg/l of 2,3-butanedione, about 100,000 µg/l to about 10,000,000 µg/l of 2-methylpropanol, about 1 µg/l to about 50,000 µg/l of 2,3-pentanedione, about 20 µg/l to about 1,000 µg/l of 2-methylpropanal, about 100 µg/l to about 8,000 µg/l of 2-methylbutanal, about 10 µg/l to about 1,000 µg/l of furaneol, about 0.5 µg/l to about 50 µg/l of ethylfuraneol, about 0.5 µg/l to about 500 µg/l of linalool, about 1 µg/l to about 500 µg/l of phenylacetaldehyde, about 1 µg/l to about 100 µg/l of geraniol, about 0.1 µg/l to about 5 µg/l of 3-hydroxy-4,5-dimethyl-2(5H)-furanone, about 250 µg/l to about 10,000 µg/l of 3-(methylthio)-1-propanol, about 0.1 µg/l to about 10 µg/l of 3-(methylthio)-1-propanal, up to about 50,000 µg/l of 5-hydroxymethylfurfural, up to about 1,000 µg/l of 5-ethoxymethylfurfural, up to about 1,000 µg/l of 5-methoxymethylfurfural, up to about 1,000 µg/l of 5-acetoxymethylfurfural, or about 1 µg/l to about 100 µg/l of (E)-2-nonenal to the quantity of water.

* * * * *